(12) United States Patent
Chen

(10) Patent No.: US 6,893,054 B2
(45) Date of Patent: May 17, 2005

(54) QUICK CONNECTION FOR TUBULARS

(75) Inventor: Kuo-Chiang Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 68 days.

(21) Appl. No.: 10/248,938

(22) Filed: Mar. 4, 2003

(65) Prior Publication Data
US 2004/0174016 A1 Sep. 9, 2004

(51) Int. Cl.⁷ .......................... F16L 27/00; F16L 37/00
(52) U.S. Cl. ..................... 285/316; 285/86; 285/277; 285/308
(58) Field of Search .................. 285/308, 314, 285/315, 316, 81, 82, 84, 86, 277, 7

(56) References Cited

U.S. PATENT DOCUMENTS

| | | | | |
|---|---|---|---|---|
| 2,377,812 A | * | 6/1945 | Scheiwer | 285/277 |
| 2,409,811 A | * | 10/1946 | Taylor, Jr. et al. | 166/125 |
| 2,521,701 A | * | 9/1950 | Earle et al. | 285/277 |
| 2,708,589 A | * | 5/1955 | Masek | 285/277 |
| 3,215,161 A | | 11/1965 | Goodwin et al. | |
| 3,267,963 A | * | 8/1966 | Hupp | 137/614.04 |
| 3,351,362 A | * | 11/1967 | Hansen | 285/83 |
| 4,269,389 A | | 5/1981 | Ekman | |
| 4,460,201 A | | 7/1984 | McGugan | |
| 4,799,546 A | | 1/1989 | Hensley et al. | |
| 4,825,893 A | * | 5/1989 | Gailey | 137/75 |
| 4,844,161 A | | 7/1989 | Rankin et al. | |
| 4,909,741 A | | 3/1990 | Schasteen et al. | |
| 5,046,761 A | * | 9/1991 | Cordes | 285/7 |
| 5,159,978 A | | 11/1992 | Tomek et al. | |
| 5,366,018 A | | 11/1994 | Van Steenwyk et al. | |
| 5,417,291 A | | 5/1995 | Leising | |
| 5,419,594 A | * | 5/1995 | Nelms | 285/315 |
| 5,443,291 A | * | 8/1995 | Stucchi et al. | 285/316 |
| 5,967,491 A | | 10/1999 | Magnuson et al. | |
| 5,988,702 A | | 11/1999 | Sas-Jaworsky | |
| 6,120,067 A | | 9/2000 | Mosing et al. | |
| 6,152,496 A | * | 11/2000 | Kouda | 285/316 |
| 6,406,070 B1 | | 6/2002 | DeLange et al. | |
| 6,450,545 B1 | * | 9/2002 | LeMay et al. | 285/93 |
| 6,485,061 B1 | | 11/2002 | Mosing et al. | |
| 6,530,605 B1 | * | 3/2003 | Weh et al. | 285/308 |
| 2001/0017222 A1 | | 8/2001 | Wentworth et al. | |
| 2002/0101079 A1 | | 8/2002 | Ehrke | |
| 2002/0193004 A1 | | 12/2002 | Boyle et al. | |

\* cited by examiner

Primary Examiner—James M. Hewitt
(74) Attorney, Agent, or Firm—Victor H. Segura; Brigitte L. Echols

(57) ABSTRACT

A connection for tubulars includes an outer housing, an inner housing receivable in the outer housing, a retainer member coupled to and axially restrained with respect to the inner housing, and a slidable member mounted on the inner housing and movable between an engaged position and a disengaged position. The slidable member carries a plurality of engagement elements that form an interlocking joint between the retainer member and the outer housing when the slidable member is in the engaged position.

27 Claims, 10 Drawing Sheets

QUICK CONNECTION FOR TUBULARS

BACKGROUND OF INVENTION

The invention relates generally to connections for tubulars. Though not limited to any specific application, the invention is particularly suitable for connections between modular tubulars forming tools or apparatus adapted for oilfield operations.

Many oilfield operations involve connecting modular tubulars together to form an integrated tool or "tool string", which is then used to perform one or more operations in a well. As known in the art, the tubulars include coiled tubing, drill pipe, well casing, wireline, while-drilling, and while-tripping instruments. The tubulars are usually assembled at a well site to form a modular unit or assembly. The tubular modules are generally elongated and cylindrical in shape, and the connections between them typically include threading elements. U.S. Patent Application Publication No. 20020193004 describes the use of threaded connections between tubulars adapted for subsurface operations. Threaded connections are generally reliable but can be relatively difficult and time consuming to make up. Because time is of paramount importance in oilfield operations, it is desirable that the connections can be engaged and disengaged quickly.

It is desirable to have a connection for modular tubulars or apparatus that can be engaged and disengaged quickly without sacrificing reliability.

SUMMARY OF INVENTION

The invention provides a connection for tubulars which comprises an outer housing, an inner housing receivable in the outer housing, a retainer member coupled to and axially restrained with respect to the inner housing, and a slidable member mounted on the inner housing and movable between an engaged position and a disengaged position. The slidable member carries a plurality of engagement elements that form an interlocking joint between the retainer member and the outer housing when the slidable member is in the engaged position.

The invention provides a tubular assembly which comprises at least two tubulars, an outer housing disposed at a distal end of one of the tubulars, and an inner housing disposed at a distal end of the other tubulars, wherein the inner housing is receivable in the outer housing. The tubular assembly further includes a retainer member coupled to and axially restrained with respect to the inner housing and a slidable member mounted on the inner housing and movable between an engaged position and a disengaged position. The slidable member carries a plurality of engagement elements that form an interlocking joint between the retainer member and the outer housing when the slidable member is in the engaged position.

The invention provides a method of connecting and disconnecting tubulars which comprises receiving an inner housing disposed at a distal end of one tubular in an outer housing disposed at a distal end of another tubular, wherein a retainer member is coupled to and axially restrained with respect to the inner housing and a slidable member carrying a plurality of engagement elements is mounted on the inner housing. The method further includes moving the slidable member to an engaged position wherein the engagement elements engage with a plurality of receptacles in the outer housing to form an interlocking joint between the retainer member and the outer housing, thereby allowing force to be transmitted from the outer housing to the inner housing through the engagement elements and the retainer member.

DETAILED DESCRIPTION

In the following description, numerous specific details are set forth in order to provide a thorough understanding of the invention. It will be apparent, however, to one skilled in the art, that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 1A:
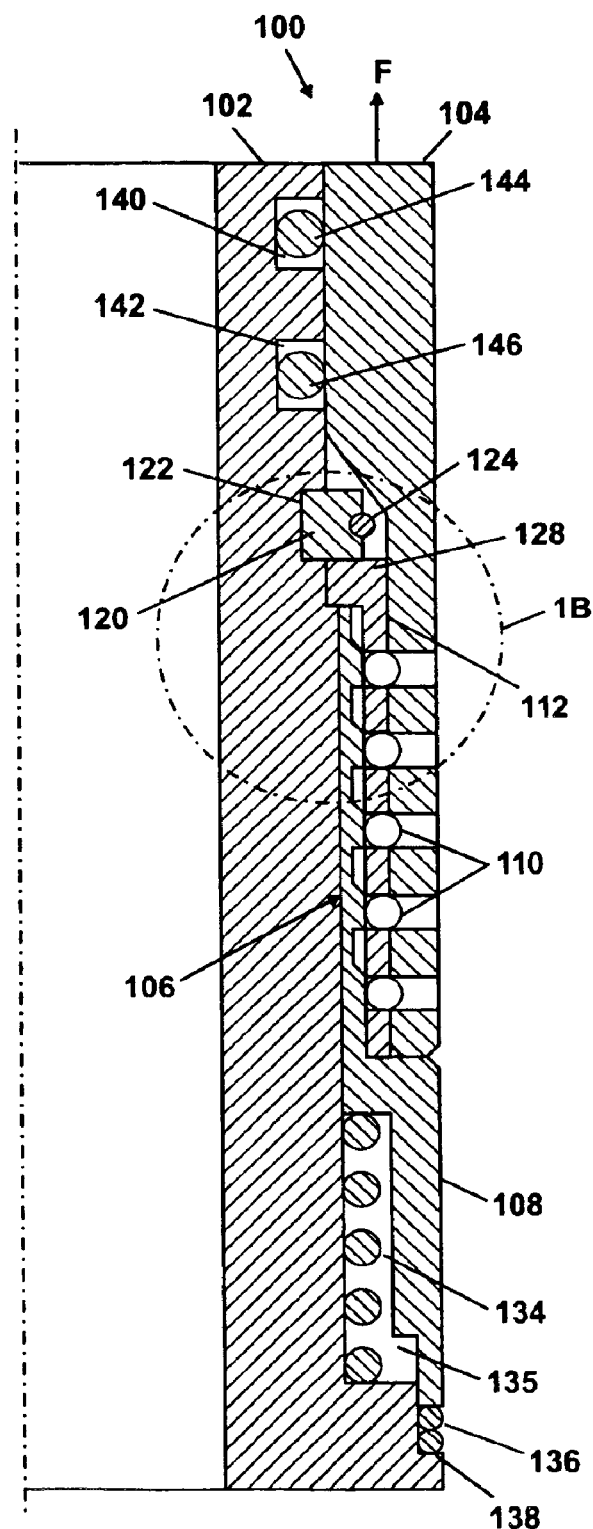
FIG. 1A shows a half cross-sectional view of a connection according to an embodiment of the invention.

FIG. 1A shows a half cross-sectional view of a connection 100 for tubulars according to one embodiment of the invention. The connection 100 includes an inner housing 102, an outer housing 104, and a latch assembly 106. In practice, the inner housing 102 and the outer housing 104 would be disposed at opposing distal ends of the tubulars to be connected together, and the latch assembly 106 would be coupled to the inner housing 102. In one embodiment, the latch assembly 106 includes a slidable sleeve 108, which carries a plurality of engagement elements 110, and a retainer 112. The slidable sleeve 108 is movable between an engaged position, wherein the engagement elements 110 form an interlocking joint between the retainer 112 and the outer housing 104, and a disengaged position, wherein the inner housing 102 is separable from the outer housing 104. The slidable sleeve 108 is shown in the engaged position in FIG. 1A.

Figure 1B:
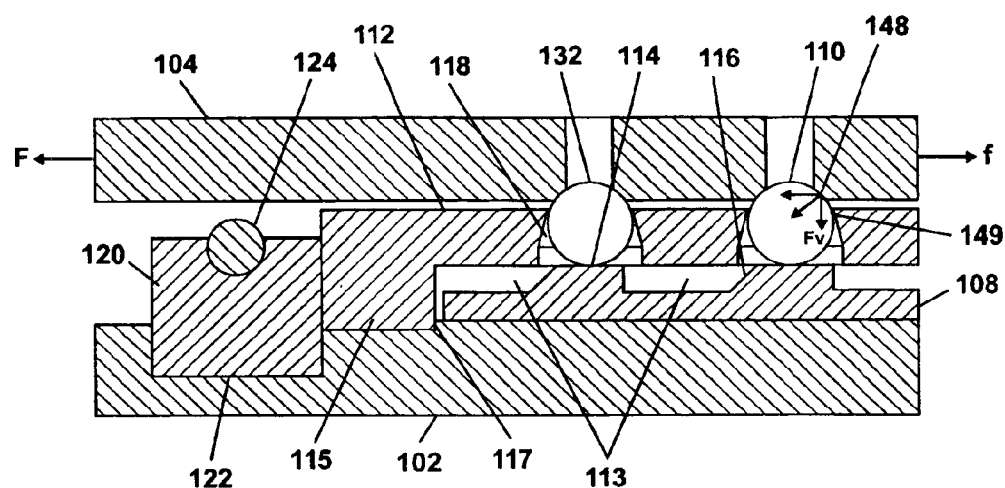
FIG. 1B shows an enlarged view of the connection in an engaged position.
Figure 1C:
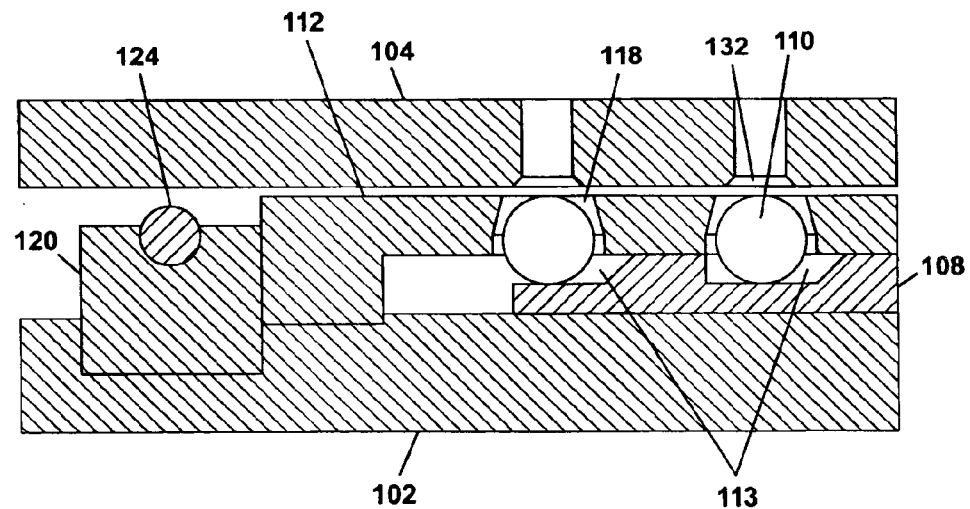
FIG. 1C shows an enlarged view of the connection in a disengaged position.

FIG. 1B shows an enlarged view of the connection 100 with the slidable sleeve 108 in the engaged position. As shown in the figure, receptacles 113 are formed on the outer surface of the slidable sleeve 108. The receptacles 113 could be through-holes, blind holes, chamfers, indentations or other receptacle distributed along the length and circumference of the slidable sleeve 108. Alternatively, the receptacles 113 could be annular grooves formed at spaced intervals along the length of the slidable sleeve 108. Protrusions 114 are also formed on the outer surface of the slidable sleeve 108, adjacent to the receptacles 113. When the slidable sleeve 108 is in the engaged position, the engagement elements 110 are situated on the protrusions 114 to form an interlocking joint between the outer housing 104 and the retainer 112. When the slidable sleeve 108 is in the disengaged position, as shown in FIG. 1C, the engagement elements 110 are situated in the receptacles 113, allowing the outer housing 104 to be separated from the inner housing 102.

The retainer 112 is mounted over the slidable sleeve 108. The retainer 112 has openings 118. When the slidable sleeve 108 is in the engaged position, as shown in FIG. 1B, the openings 118 are aligned with the protrusions 114. When the slidable sleeve 108 is moved to the disengaged position, as shown in FIG. 1C, the openings 118 are aligned with the receptacles 113, allowing the engagement elements 110 to drop through the openings 118 into the receptacles 113. The geometry of the openings 118 in the retainer 112 is such that the engagement elements 110 can move freely in an inward direction (i.e., towards the inner housing 102) but have limited travel in an outward direction (i.e., towards the outer housing 104). Limited travel in the outward direction prevents the engagement elements 110 from falling out of the slidable sleeve 108 when the outer housing 104 is not present.

Figure 1D:
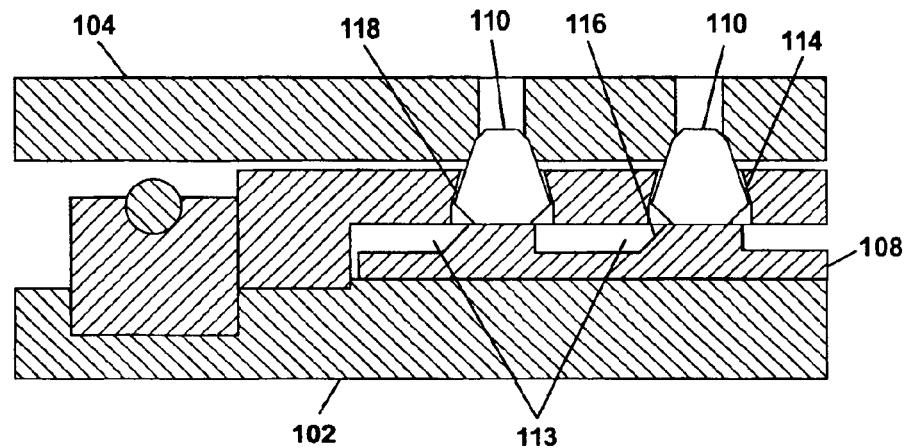
FIG. 1D shows wedge-shaped engagement elements according to another embodiment of the invention.

The outer housing 104 has receptacles 132 having a profile that matches that of the engagement elements 110. Although the receptacles 132 are shown as through-holes, they could also be blind holes, grooves, indentations, or other receptacles having the appropriate profile to match with the engagement elements 110. When the slidable sleeve 108 is in the engaged position, as shown in FIG. 1B, the engagement elements 110 protrude through the openings 118 in the retainer 112 into the receptacles 132 in the outer housing 104. In FIG. 1B, the engagement elements 110 have a spherical shape. In alternate embodiments, the engagement elements 110 could have a cylindrical shape, a wedge shape, such as shown in FIG. 1D, or other shape that can fit into the receptacles 132 in the outer housing 104. Preferably, the engagement elements 110 are made of a durable and corrosion-resistant material, such as steel. In the illustrations, only one row of engagement elements 110 is shown. In practice, the number of rows and the number of engagement elements in each row can vary to meet the load requirements.

One of the primary functions of the retainer 112 is to transmit forces from the outer housing 104 to the inner housing 102 when the slidable sleeve 108 is in the engaged position. To accomplish this, the retainer 112 has a fringed end 115, as shown in FIG. 1B, which is axially restrained with respect to the inner housing 102 by a split spacer 120 and a shoulder 117 on the inner housing 102. The split spacer 120 is disposed in a recess 122 on the outer circumference of the inner housing 102. The split spacer 120 is made of two-half pieces, which are secured to the inner housing 102 by a wire snap ring 124. In operation, a compression force (f) acting on the connection 100 is transmitted from the outer housing 104 to the engagement elements 110 via the contact surface 148, then to the retainer 112 via the contact surface 149, then to the inner housing 102 via the shoulder 117. A tension force (F) acting on the connection 100 is transmitted from the outer housing 104 to the engagement elements 110 via the contact surface 148, then to the retainer 112 via the contact surface 149, then to the inner housing 102 via the split spacer 120. The tension and compression force rating of the interlocking joint formed between the retainer 112 and the outer housing 104 is very high, e.g., on the order of 50,000 lb for a 3⅜ in. diameter tubular.

A tension force (F) or compression force (f) acting on the connection 100 in the engaged position will result in vertical forces (Fv) acting on the engagement elements 110. These vertical forces (Fv) will try to push the engagement elements 110 out of the receptacle 132 due to the slopes (or curves) on the contact surfaces 148 between the engagement elements 110 and the outer housing 104. However, the slidable sleeve 108 will ensure that the engagement elements 110 stay in between the openings 118 in the retainer 112 and the receptacles 132 in the outer housing 104, respectively. Also, the connection 100 may be subjected to torsion during operation. To prevent the connection 100 from becoming disengaged during operation, an anti-rotation mechanism, such as a key 111 on the retainer 112 coupled to a keyway 109 on the inner housing 102, is used to prevent relative rotation between the inner housing 102 and the retainer 112 when the slidable sleeve 108 is in the engaged position.

Figure 1E:
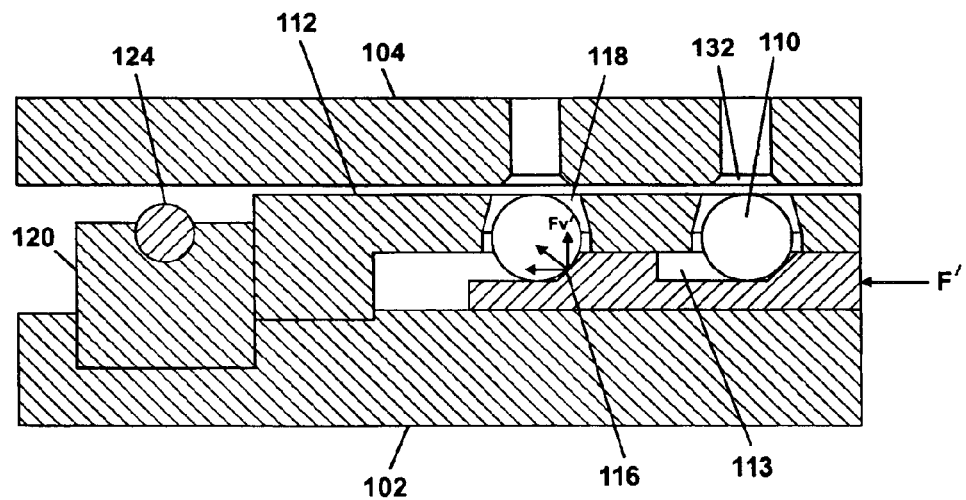
FIG. 1E shows an enlarged view of the connection while moving a slidable member from a disengaged position to an engaged position.

In one embodiment, the receptacles 113 are connected to the protrusions 114 via sloped or curved surfaces 116. As shown in FIG. 1E, when an external force (F') is applied to move the slidable sleeve 108 from the disengaged position (shown in FIG. 1C) to the engaged position (shown in FIG. 1B), the resulting vertical forces (Fv') acting on the engagement elements 110 will urge the engagement elements 110 up the protrusions 114 because of the slope (or curve) on the surfaces 116.

Returning to FIG. 1A, a coil spring 134 is disposed in a cavity 135 formed between the slidable sleeve 108 and the inner housing 102 to prevent the slidable sleeve 108 from backing off from the engaged position due to external force, e.g., external force due to vibration of the tool string during a trip into the well. To save time, the force of the spring 134 is generally on the order of 10 to 15 lb, i.e., small enough to be overcome by a single human hand without any special tooling. One or more wire snap rings 136 may also be positioned in a recess 138 formed between the slidable sleeve 108 and the inner housing 102 to further prevent the slidable sleeve 108 from backing off from the engaged position due to external force. Other types of locking devices may also be used, such as screws, pins, or other objects that can be positioned in the recess 138.

Recesses 140, 142 are provided on the outer circumference of the inner housing 102. In one embodiment, O-ring seals 144, 146 are mounted in the recesses 140, 142, respectively, to seal between the inner housing 102 and the outer housing 104, thereby protecting the interior of the inner housing 102 and outer housing 104 from the external environment. Other types of seals besides O-ring seals 144, 146, such as corner seals, face seals, or seals with different materials, may also be used to seal the inner housing 102 and the outer housing 104 to the external environment.

Figure 2A:
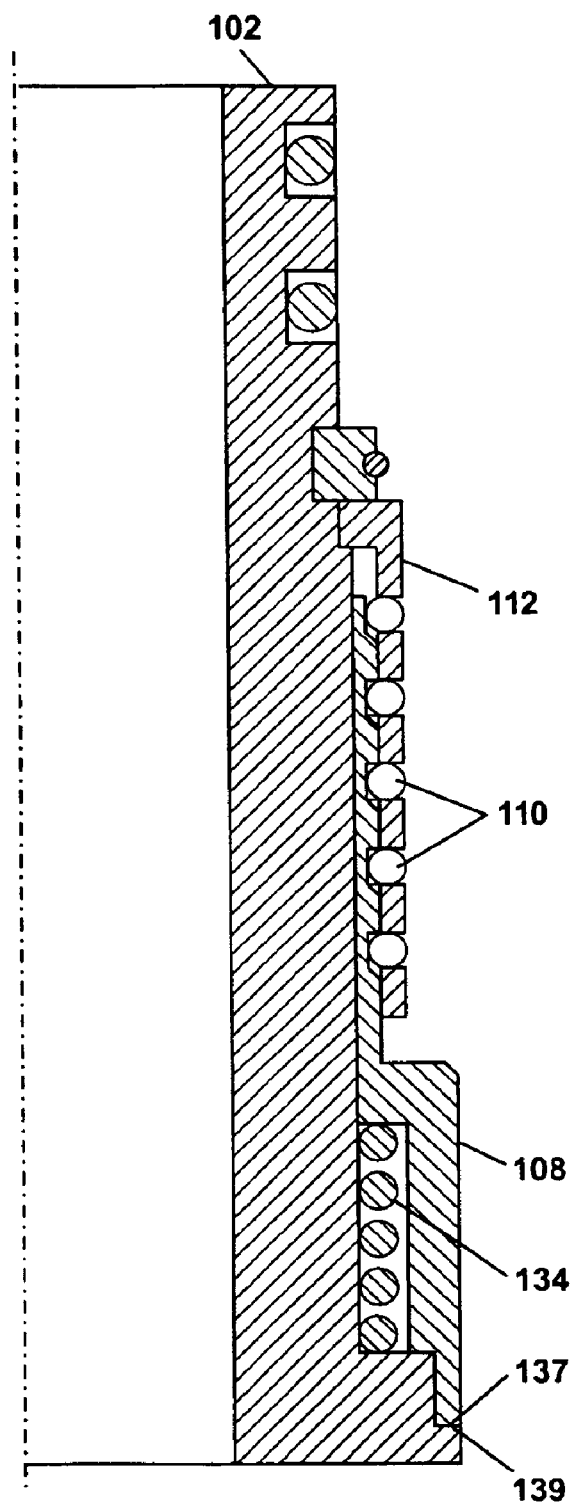
FIGS. 2A–2C illustrate a sequence of operations for engaging a connection according to an embodiment of the invention.
Figure 2B:
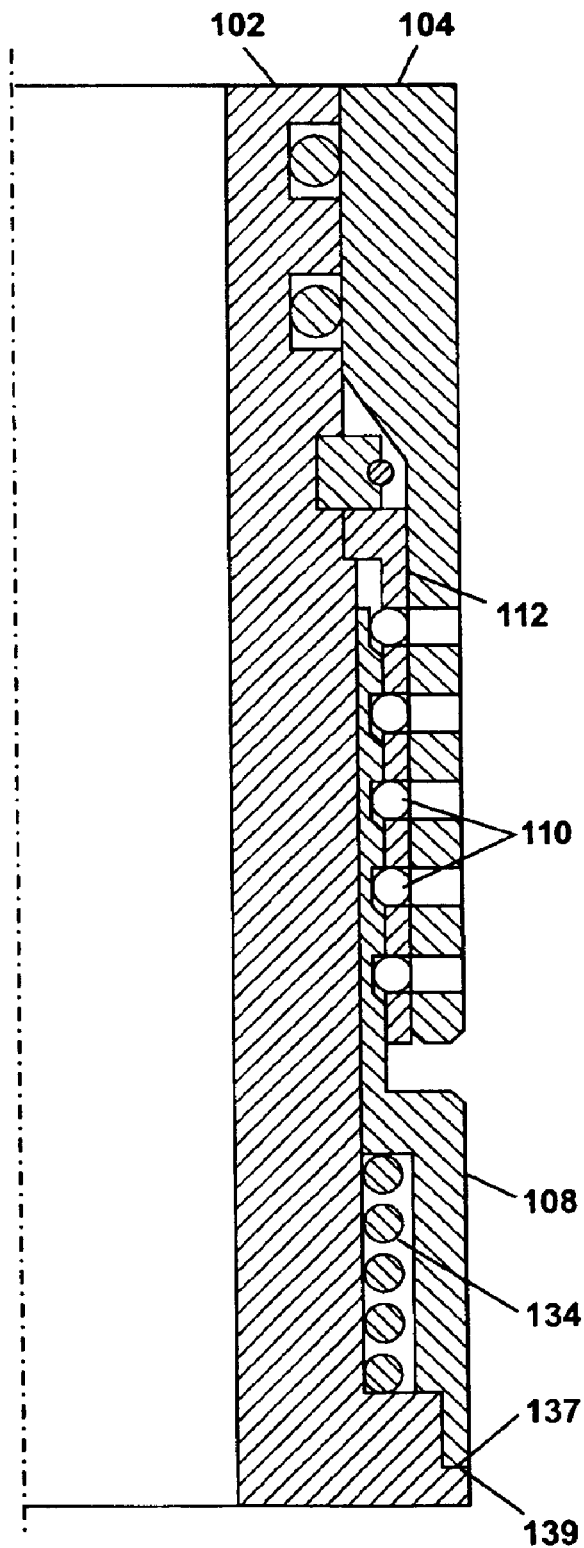
Figure 2C:
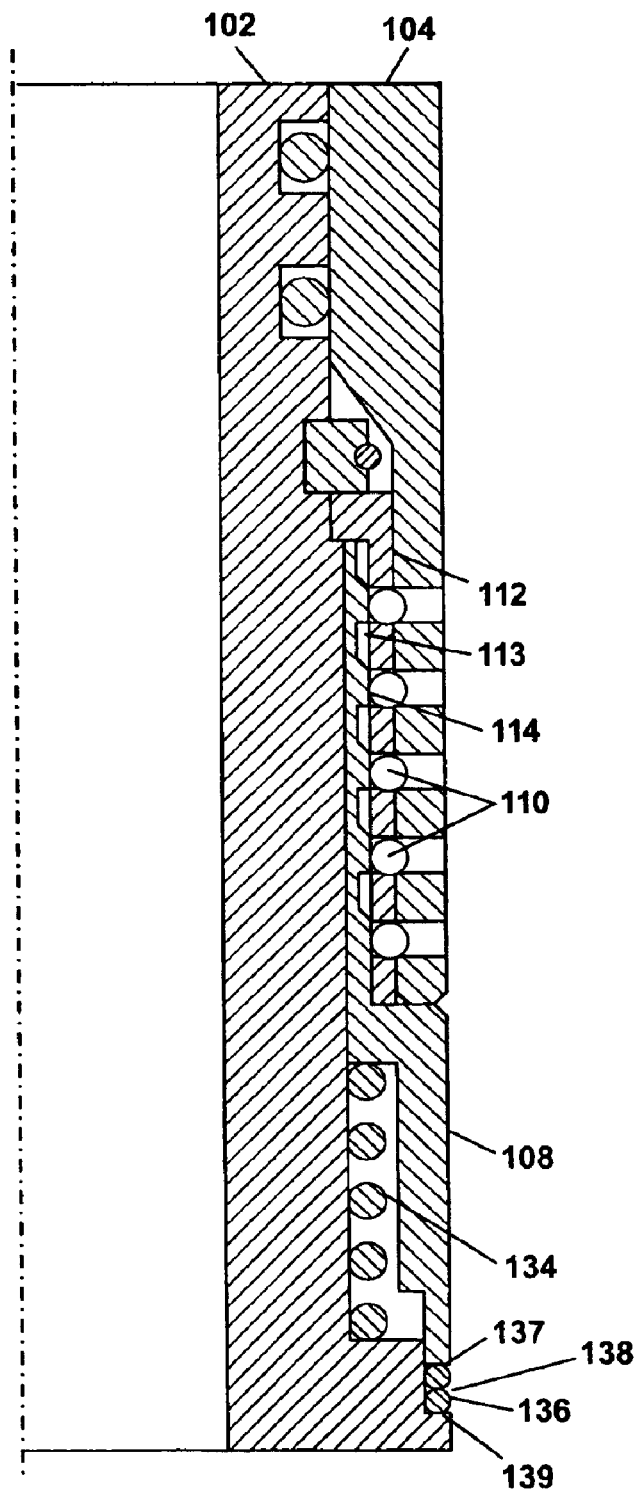

One of the advantages of the present invention is that the connection 100 can be engaged quickly and easily without the use of any special tooling. FIGS. 2A–2C illustrate a sequence of operations for engaging the connection 100. In FIG. 2A, the biasing force of the coil spring 134 is overcome (e.g., by hand), and the distal end 137 of the slidable sleeve 108 is pushed against the shoulder 139 on the inner housing 102. In FIG. 2B, the inner housing 102 is received inside the outer housing 104, with the distal end 137 of the slidable sleeve 108 still pushed against the shoulder 139 on the inner housing 102. In FIG. 2C, the slidable sleeve 108 is released and pushed against the outer housing 104 so that the engagement elements 110 move from the receptacles 113 onto the protrusions 114 and engage with the outer housing 104. The slidable sleeve 108 can be locked in place by disposing wire snap rings 136 (or other locking device) in the recess 138 formed between the distal end 137 of the slidable sleeve 108 and the shoulder 139 of the inner housing 102.

Figure 3A:
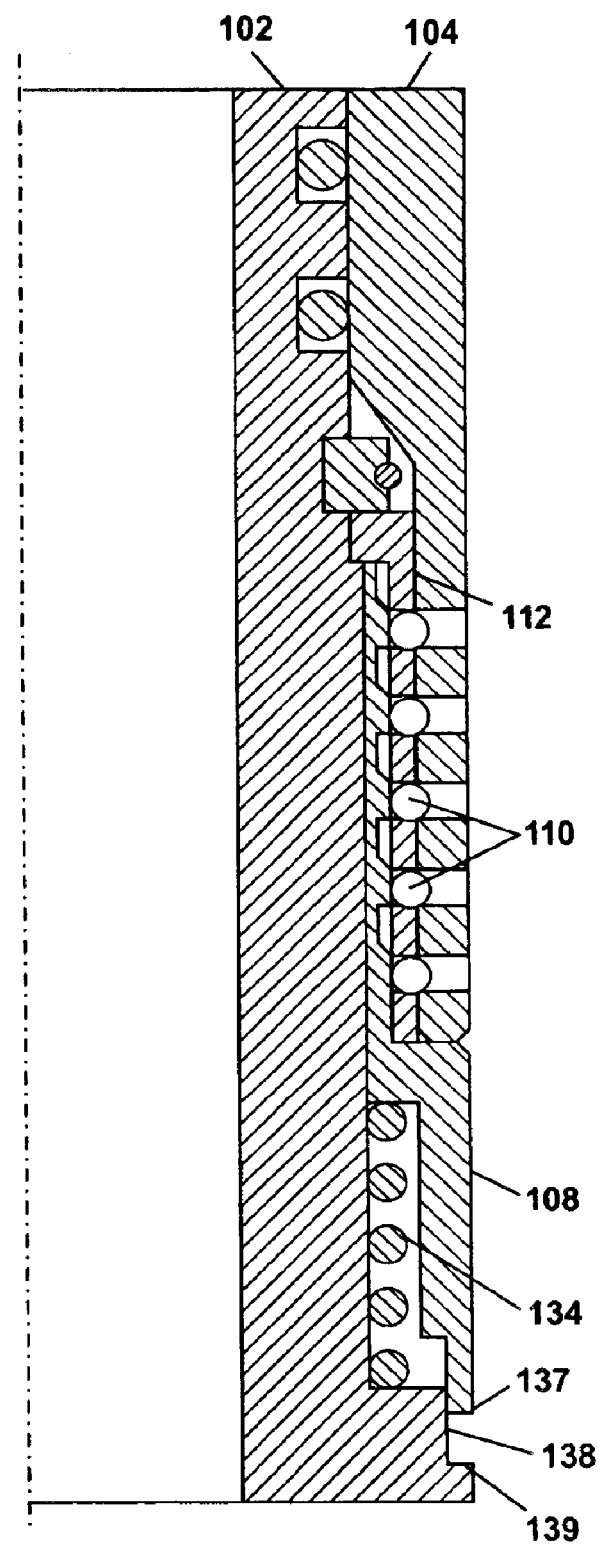
FIGS. 3A–3C illustrate a sequence of operations for disengaging a connection according to an embodiment of the invention.
Figure 3B:
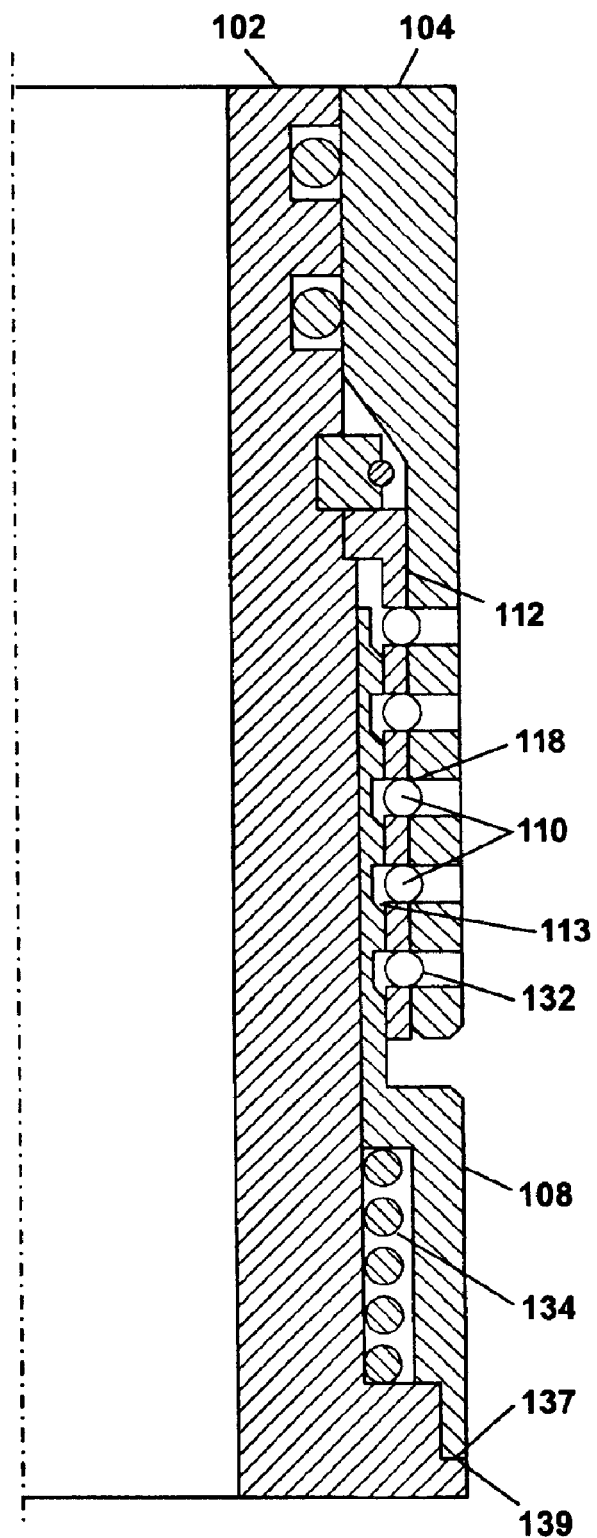
Figure 3C:
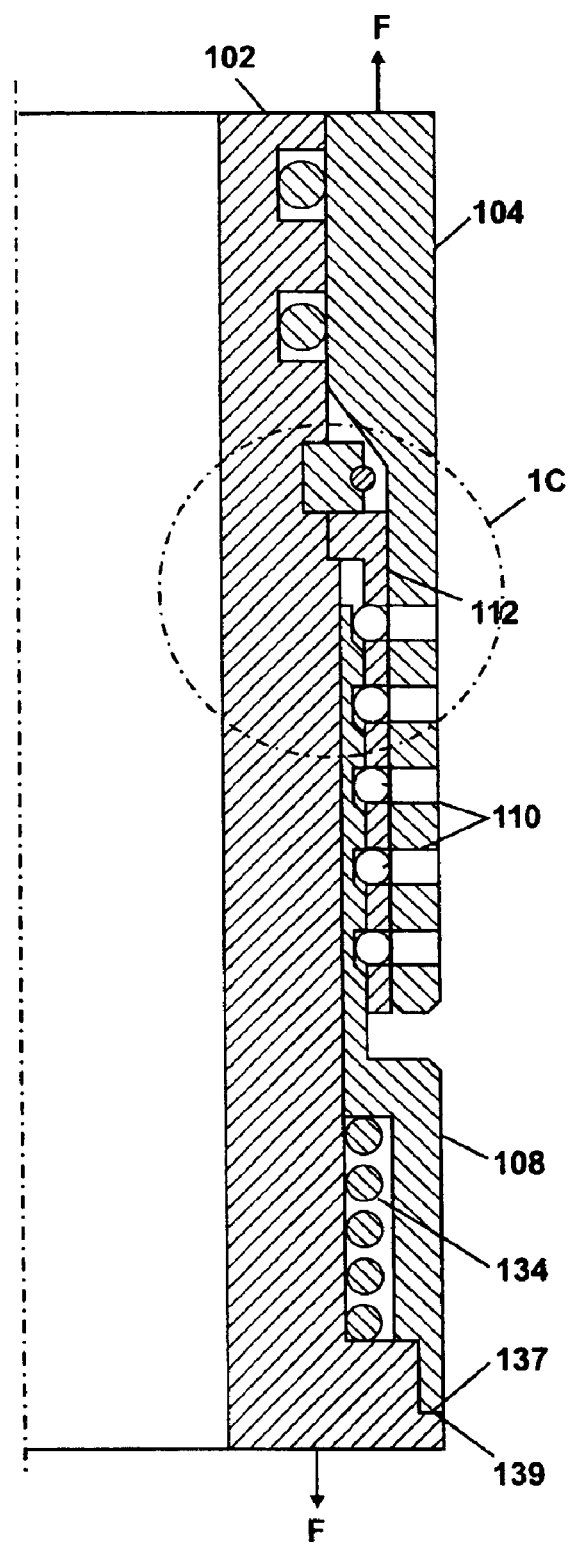
Figure 4:
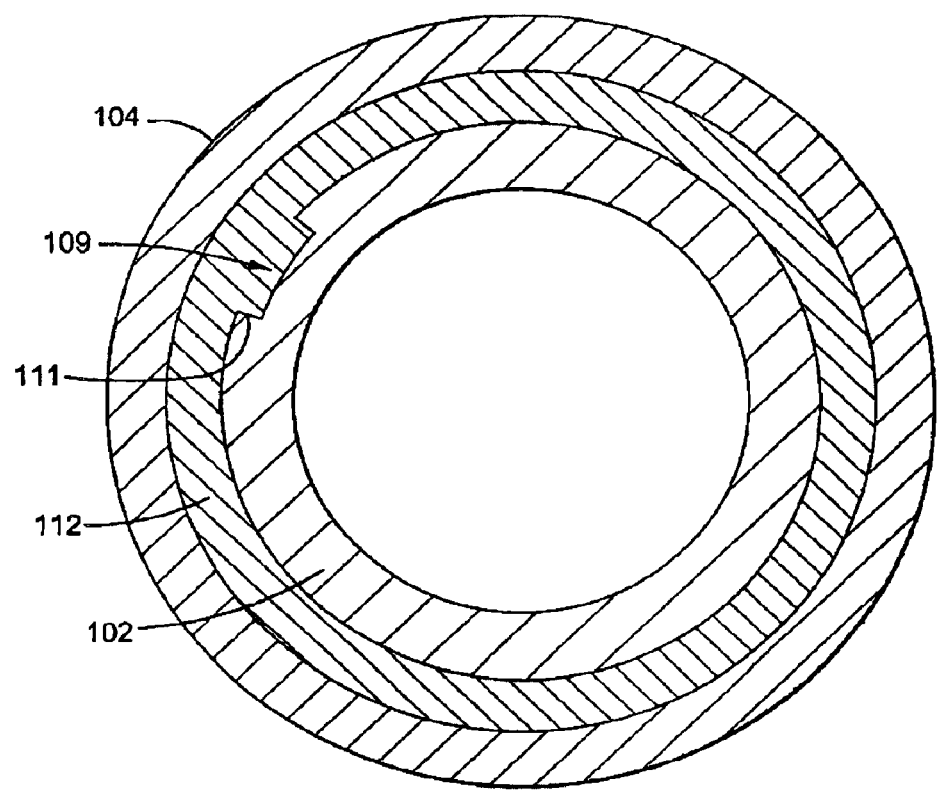
FIG. 4 is a schematic diagram of a connection including an anti-rotation mechanism according to an embodiment of the invention.

Another advantage of the invention is that the connection 100 can be disengaged quickly and easily without the use of any special tooling. FIGS. 3A–3C illustrate a sequence of operations for disengaging the connection 100. In FIG. 3A, the wire snap rings (136 in FIG. 2C) are removed from the recess 138. In FIG. 3B, the biasing force of the coil spring 134 is overcome (e.g., by hand), and the distal end 137 of the slidable sleeve 108 is pushed against the shoulder 139 on the inner housing 102. This results in the receptacles 113 in the slidable sleeve 108 being aligned with the openings 118 in the retainer 112 and the receptacles 132 in the outer housing 104. In FIG. 3C, an external force (F) is applied to both the inner housing 102 and the outer housing 104 to force the engagement elements 110 into the receptacles 113 in the slidable sleeve 108. Once the engagement elements 110 are in the receptacles 113, the outer housing 104 can be separated from the inner housing 102.

The connection embodiments of the invention may be formed of any suitable material depending on the application. In oilfield operations, the connection components will generally be formed of metal due to the environmental conditions and stresses involved. However, embodiments of the invention may include a mixture of metallic and non-metallic components. For example, in one embodiment the housings 102, 104 may be formed of metal while the engagement elements 110 are formed of TEFLON or of a metallic element coated with a nonmetallic compound (not shown). The invention is highly suitable for the increasing use of composites and other nonmetallic materials in oilfield tubulars and apparatus.

While the invention has been described with respect to specific embodiments, those skilled in the art, having benefit of this disclosure, will appreciate that other embodiments can be devised which do not depart from the scope of the invention. It will also be appreciate that the invention is not limited to any one particular field or use. For the purposes of this specification it will be clearly understood that the word "comprising" means "including but not limited to", and that the word "comprises" has a corresponding meaning.

What is claimed is:

1. A connection for tubulars, comprising:
   an outer housing;
   an inner housing receivable in the outer housing; and
   a retainer member coupled to and axially restrained with respect to the inner housing; and
   a slidable member mounted on the inner housing and movable between an engaged position and a disengaged position, the slidable member carrying a plurality of engagement elements which form an interlocking joint coupling the retainer member and the outer housing when the slidable member is in the engaged position;
   wherein the outer housing includes at least one receptacle adapted to receive at least one engagement element.

2. The connection of claim 1, wherein the retainer member, the engagement elements, and the inner housing have contacting surfaces which enable force from the outer housing to be transmitted to the inner housing.

3. The connection of claim 1, wherein the slidable member comprises a plurality of protrusions which carry the engagement elements when the slidable member is in the engaged position.

4. The connection of claim 3, wherein the slidable member further comprises a plurality of receptacles which carry the engagement elements when the slidable member is in the disengaged position.

5. The connection of claim 4, further comprising a surface that urges the engagement elements up the protrusions as the slidable member is moved from the disengaged position to the engaged position.

6. The connection of claim 1, wherein the retainer member comprises means for retaining the engagement elements on the slidable member.

7. The connection of claim 1, further comprising an anti-rotation mechanism which rotationally restrains the retainer member with respect to the inner housing.

8. The connection of claim 1, further comprising a seal member for isolating an interior of the inner and outer housings from the external environment.

9. The connection of claim 1, further comprising a spring member which prevents the slidable member from backing off from the engaged position due to an external force.

10. The connection of claim 1, further comprising a locking device which prevents the slidable member from backing off from the engaged position due to an external force.

11. A tubular assembly, comprising:
    at least two tubulars;
    an outer housing disposed at a distal end of one of the tubulars;
    an inner housing disposed at a distal end of the other tubulars, the inner housing being receivable in the outer housing;
    a retainer member coupled to and axially restrained with respect to the inner housing; and
    a slidable member mounted on the inner housing and movable between an engaged position and a disengaged position, the slidable member carrying a plurality of engagement elements which form an interlocking joint coupling the retainer member and the outer housing when the slidable member is in the engaged position;
    wherein the outer housing includes at least one receptacle adapted to receive at least one engagement element.

12. The tubular assembly of claim 11, wherein the retainer member, the engagement elements, and the inner housing have contacting surfaces which enable force from the outer housing to be transmitted to the inner housing.

13. The tubular assembly of claim 11, wherein the slidable member comprises a plurality of protrusions which carry the engagement elements when the slidable member is in the engaged position.

14. The tubular assembly of claim 13, wherein the slidable member further comprises a plurality of receptacles which carry the engagement elements when the slidable member is in the disengaged position.

15. The tubular assembly of claim 14, further comprising a surface that urges the engagement elements up the protrusions as the slidable member is moved from the disengaged position to the engaged position.

16. The tubular assembly of claim 11, wherein the retainer member comprises means for retaining the engagement elements on the slidable member.

17. The tubular assembly of claim 11, further comprising an anti-rotation mechanism which rotationally restrains the retainer member with respect to the inner housing.

18. The tubular assembly of claim 11, further comprising a seal member for isolating an interior of the inner and outer housings from the external environment.

19. The tubular assembly of claim 11, further comprising a spring member which prevents the slidable member from backing off the engaged position due to an external force.

20. The tubular assembly of claim 11, further comprising a locking device which prevents the slidable member from backing off from the engaged position due to an external force.

21. A method of connecting and disconnecting tubulars, comprising:

receiving an inner housing disposed at a distal end of one tubular in an outer housing disposed at a distal end of another tubular, wherein a retainer member is coupled to and axially restrained with respect to the inner housing and a slidable member carrying a plurality of engagement elements is mounted on the inner housing; and moving the slidable member to an engaged position wherein the engagement elements engage with a plurality of receptacles in the outer housing to form an interlocking joint coupling the retainer member and the outer housing, thereby allowing force to be transmitted from the outer housing to the inner housing through the engagement elements and the retainer member.

22. The method of claim 21, wherein receiving the inner housing in the outer housing comprises overcoming a biasing force used in preventing the slidable member from backing off from the engaged position.

23. The method of claim 22, further comprising applying the biasing force to the slidable member after moving the slidable member to the engaged position.

24. The method of claim 21, further comprising using a locking device to prevent the slidable member from backing off from the engaged position.

25. The method of claim 21, further comprising moving the slidable member to a disengaged position wherein the engagement elements are separated from the receptacles in the outer housing.

26. The method of claim 25, wherein moving the slidable member to the disengaged position comprises overcoming a biasing force used in preventing the slidable member from backing off from the engaged position.

27. The method of claim 25, wherein moving the slidable member to the disengaged position comprises applying an external force to both the inner and outer housings such that the engagement elements drop out of the receptacles in the outer housing.

* * * * *